US012613303B2

(12) United States Patent
Mei et al.

(10) Patent No.: US 12,613,303 B2
(45) Date of Patent: Apr. 28, 2026

(54) EFFICIENT PARTICLE FILTER NODE POSITIONING METHOD FOR OCEAN SENSOR NETWORKS

(71) Applicants: Shanghai Maritime University, Shanghai (CN); Shanghai Ship and Shipping Research Institute CO., LTD., Shanghai (CN)

(72) Inventors: Xiaojun Mei, Shanghai (CN); Huafeng Wu, Shanghai (CN); Dezhi Han, Shanghai (CN); Hao Zhang, Shanghai (CN); Bing Han, Shanghai (CN); Xinqiang Chen, Shanghai (CN); Jiangfeng Xian, Shanghai (CN)

(73) Assignees: Shanghai Maritime University, Shanghai (CN); Shanghai Ship and Shipping Research Institute CO., LTD., Shanghai (CN)

( * ) Notice: Subject to any disclaimer, the term of this patent is extended or adjusted under 35 U.S.C. 154(b) by 252 days.

(21) Appl. No.: 18/631,847

(22) Filed: Apr. 10, 2024

(65) Prior Publication Data

US 2024/0353519 A1 Oct. 24, 2024

(30) Foreign Application Priority Data

Apr. 12, 2023 (CN) .......................... 202310390266.0

(51) Int. Cl.
*G01S 5/02* (2010.01)

(52) U.S. Cl.
CPC .......... *G01S 5/0278* (2013.01); *G01S 5/0289* (2013.01)

(58) Field of Classification Search
None
See application file for complete search history.

(56) References Cited

FOREIGN PATENT DOCUMENTS

CN 107466005 A * 12/2017 .............. H04W 4/70

* cited by examiner

*Primary Examiner* — Robert W Hodge
*Assistant Examiner* — Bongani Jabulani Mashele
(74) *Attorney, Agent, or Firm* — Pilloff Passino & Cosenza LLP; Rachel Pilloff; Sean Passino

(57) ABSTRACT

The application relates to an efficient particle filter node positioning method for ocean sensor networks, including the following steps: 1) obtaining a first state vector of mean value of posterior probability at k−1 moment; 2) establishing the state model of the nonlinear system; 3) obtaining the observation model of the nonlinear system; 4) propagating particles, and calculating the state vector $\bar{u}^+_k$ at the next moment according to the particle vector at k−1 moment; 5) obtaining the observed value and calculating the weight; 6) judging whether it is degraded, if not, the weight is used to calculate the position expectation, otherwise, 7) is executed; 7) modifying small-weight particles; 8) resampling the improved residual and normalizing the weights; and 9) using the weight of 8) to calculate the position expectation and realize node positioning.

10 Claims, 8 Drawing Sheets

EFFICIENT PARTICLE FILTER NODE POSITIONING METHOD FOR OCEAN SENSOR NETWORKS

CROSS-REFERENCE TO RELATED APPLICATIONS

This application claims priority to Chinese Patent Application No. 202310390266.0, filed on Apr. 12, 2023, the contents of which are hereby incorporated by reference.

TECHNICAL FIELD

The application relates to the field of ocean wireless sensor network node positioning, and in particular to an efficient particle filter node positioning method for ocean sensor networks.

BACKGROUND

As one of the key technologies in marine ecological environment monitoring, marine disaster early warning and deep-sea exploration, ocean sensor networks (OSNs) have important research significance and good application prospects. In OSNs, node positioning technology is an indispensable key link, and the corresponding location information may be obtained through node positioning, which provides an important basis for analysis and decision-making after collecting data. However, the marine environment is complex and changeable, and the high dynamics and uncertainty make the node positioning technology face severe challenges. At present, the positioning technology mainly adopts particle filter positioning method. Although the positioning method based on particle filter may deal with the nonlinear positioning problem in high dynamic and uncertain environment well, the existing positioning method based on particle filter may not balance the relationship between positioning accuracy and positioning efficiency well. Specifically, when the number of particles is large enough, the positioning algorithm based on particle filter may have better positioning accuracy, but the positioning efficiency is greatly reduced. Massive particles occupy high computing resources and consume the energy of nodes. However, the nodes deployed on the ocean are often difficult to recharge and replace. Once the energy is insufficient, the life of the whole OSNs network will be shortened, which will seriously affect the performance of OSNs ocean monitoring.

SUMMARY

The objective of the present application is to provide an efficient particle filter node positioning method for ocean sensor networks that balances positioning accuracy and efficiency.

The objective of the application may be achieved by the following technical scheme:

The application relates to an efficient particle filter node positioning method for ocean sensor networks, including the following steps:

S1, establishing a state model of a nonlinear system according to motion characteristics of a velocity field in a sea area and considering an interaction force between a tidal field and a residual field;

S2, modeling a signal intensity received by each node in the ocean sensor networks based on a signal intensity attenuation model to obtain an observation model of the nonlinear system;

S3, obtaining a first state vector $\bar{u}^{+}{}_{k-1}$ of a mean value of a posterior probability at a k−1 moment, calculating a second state vector $\bar{u}^{+}{}_{k}$ at a k moment, representing a state vector $\bar{u}^{+}{}_{k-1}$ of an i-th particle at the k−1 moment by the first state vector, and then performing a Taylor expansion on a state vector $\bar{u}^{+}{}_{k}$ of the i-th particle at the first state vector $\bar{u}^{+}{}_{k-1}$ to calculate second particle state vectors of all particles approximate to a first-order Taylor series term at the k moment; then, performing the Taylor expansion on the second particle state vectors in two steps by a multidimensional Richardson extrapolation method to obtain third particle state vectors of all the particles approximate to a second-order Taylor series term at the k moment.

S4, based on a normalized weight at the k−1 moment, calculating a normalized weight at the k moment in a recursive way, and realizing a normalization based on observed values obtained by the observation model;

S5, judging whether the particles are degraded based on a number of effective particles, if the particles are degraded based on the number of effective particles, executing S6, if the particles are not degraded based on the number of effective particles, taking the normalized weight at the k moment and a particle set at this time as a result weight and a result particle set, and executing S8;

S6, performing a resampling, then dividing a whole particle set into a small-weight particle set and a large-weight particle set according to a weight threshold, keeping state vectors and weight values of particles in the large-weight particle set unchanged, modifying state vectors of particles in the small-weight particle set, and further modifying and normalizing weights of small-weight particles to obtain modified particles, and taking modified and normalized weights of the small-weight particles as result weights;

S7, performing a residual resampling according to the modified particles to obtain a replicated particle set, and taking the replicated particle set as the result particle set; and S8, combining the result particle set and the result weight, calculating posterior probability distributions of unknown nodes at the k moment, and calculating expected values of positions according to obtained posterior probability distributions to obtain estimated positions of the unknown nodes at the k moment.

Further, the Taylor expansion in two steps specifically includes:

performing the Taylor expansion on the second particle state vectors at $$\bar{u}_{k-1}^{+} + \frac{\Delta u^{i}}{2},$$

and then performing the Taylor expansion on $$F\left(\bar{u}_{k-1}^{+} + \frac{\Delta u^{i}}{2}, \alpha_{k-1}\right) \text{ at } \bar{u}_{k-1}^{+},$$

where $\Delta u^{i}$ is a corresponding gradient, $\alpha_{k-1}$ is a state noise, and F is a state equation.

Further, an expression of the normalized weight at the k moment is:

$$w_k^{(i)} \propto \tilde{w}_{k-1}^{(i)} p\left(z_k \mid u_k^{(i)}\right),$$

where $$w_{k-1}^{(i)}$$

is a weight of the i-th particle at the k moment, x represents a proportional sign, $$\tilde{w}_{k-1}^{(i)}$$

is a normalized weight of the i-th particle at the k−1 moment, $$p\left(z_k \mid u_k^{(i)}\right)$$

represents a posterior distribution of the i-th particle at the k moment, $z_k$ represents an observed value at the k moment, and $$u_k^{(i)}$$

represents the state of the i-th particle at the k moment;
an expression of the normalized weight of the i-th particle at the k−1 moment is:

$$\tilde{w}_{k-1}^{(i)} = \frac{w_{k-1}^{(i)}}{\sum_{i=1}^{N} w_{k-1}^{(i)}},$$

where $$\tilde{w}_{k-1}^{(i)}$$

is the normalized weight of the i-th particle at the k−1 moment, N represents a number of the particles, and $$w_{k-1}^{(i)}$$

is a weight of the i-th particle at the k−1 moment.
Further, an expression of particle sets divided into two categories is:

$$u_k^{(i)} = \begin{cases} S_l, w_k^i < W_{thres} \\ S_h, w_k^j \geq W_{thres} \end{cases},$$

where $$u_k^{(i)}$$

is the third particle state vector of the i-th particle at the k moment, $S_l$ is the small-weight particle set, $S_h$ is the large-weight particle set, and $$w_k^i$$

is a modified weight of the i-th particle at the k moment, and $W_{thres}$ is the weight threshold.
Further, the step of determining the weight threshold is:
sorting all sampled particles according to the weights in a ascending order, and storing sorted particles in a set; assuming a weight of an r-th particle as the weight threshold, obtaining an expression of a weight value difference between the small-weight particle set and the large-weight particle set; calculating the weight value difference from a first particle in the set, and when the weight value difference is greater than 0, determining a serial number r of the particle at this time to obtain the weight threshold.
Further, a linear interpolation method is adopted to modify the state vectors of the particles in the small-weight particle set, and state vectors of the modified particles of the small-weight particle set are as follows:

$$u_{km}^s = \frac{w_{kl}^s u_{kl}^s + w_{kh}^j u_{kh}^j}{w_{kl}^s + w_{kh}^j},$$

where $$u_{km}^s$$

is the state vectors of the modified particles of the small-weight particle set, $$u_{kl}^s$$

is a state vector of an s-th particle to be modified in a small-weight particle set $S_l$, $$u_{kh}^j$$

is a state vector of a j-th particle in a large-weight particle set $S_h$, $$w_{kl}^s$$

is a weight value of an s-th small-weight particle in the small-weight particle set $S_l$, $$w_{kh}^j$$

5 is a weight value of a j-th large-weight particle in the large-weight particle set $S_h$, s=1, 2, . . . , $N_l$ and j=1, 2, . . . , $N_h$, $N_l$ and $N_h$ are numbers of the particles in the sets $S_l$ and $S_h$ respectively.

Further, the modified weights of small-weight particles are:

$$w_k^s = w_{k-1}^s p(z_k|u_{km}^s)$$

where $$w_{k-1}^s$$

represents the weight value of the s-th small-weight particle in the small-weight particle set $S_l$ at the k−1 moment, $$w_{k-1}^s$$

represents the weight value of the s-th small-weight particle in the small-weight particle set $S_l$ at the k moment, $$u_{km}^s$$

represents the state vectors of the modified particles of the small-weight particle set, $z_k$ represents the observed value at the k moment, and $$p(z_k|u_{km}^s)$$

represents the posterior distribution corresponding to the modified particles of the small-weight particle set.

Further, in the S7, when copying the particle sets, a deterministic selection and a random selection are carried out, and when $$C_k^i > 2,$$

where $$C_k^i$$

a total number of times that the i-th particle is selected in a process of the deterministic selection in a first step and the random selection in a second step, $\Delta h^1$ represents a maximum deviation value, the $\Delta h^1$ of an i-th particle to be replicated is less than half of a minimum value of an average difference of state vectors between an i-th particle to be replicated and all other particles to be replicated.

Further, when copying the particle sets, a deviation value between a state vector of a new particle generated according to the third particle state vector

6

$$u_k^{(i)}$$

and the third particle state vector $$u_k^{(i)}$$

is calculated, and an expression of the deviation value is:

$$\Delta h^g = \gamma^i e^{-\frac{2g-1}{p}}, g = 1, 2, \ldots, \left\lfloor \frac{C_k^i - 1}{2} \right\rfloor,$$

where $\gamma^i$ is a parameter to adjust a dispersion degree of the i-th particle needing to be resampled, $$C_k^i$$

is a total number of times the i-th particle being selected in the process of the deterministic selection in the first step and the random selection in the second step, g is an index of a corresponding selection times, and p is a number of times selected.

Further, when the particle sets degenerate, after the S6 and the S7 are executed, an expression of the expected values of the positions is:

$$E(u_k|z_{1:k}) = \int p(u_k|z_{1:k}) \cdot \bar{U}_k d\bar{U}_k \approx \sum_{i=1}^N \tilde{w}_k^{(i)} \bar{U}_{k'}^i,$$

where $E(u_k|z_{1:k})$ is the expected values of the positions, $u_k$ is a state of a target to be located, $z_{1:k}$ represents corresponding observation values from moment 1 to k, $\bar{U}_k$ is the replicated particle set, N is the number of particles, $$\tilde{w}_k^{(i)}$$

is a modified normalized particle weight, and $p(u_k|z_{1:k})$ is the posterior probability distributions of the unknown nodes.

Compared with the prior art, the application has the following beneficial effects.

According to the application, based on the average value of the last moment in the particle propagation process and combined with Taylor series expansion, a high-precision particle state vector is constructed by applying a multidimensional Richardson extrapolation method, so that the efficiency is improved and the accuracy is ensured. Then, the small-weight particles are modified by the linear interpolation method, and the dispersion parameter is introduced to improve the residual resampling method, and a new particle replication method is obtained to calculate the posterior probability of the next moment and jointly estimate the current position of the unknown node. Compared with the existing particle filter positioning technology, the method of the application better balances the relationship between positioning accuracy and efficiency, and provides a feasible solution to the positioning problem with high accuracy and high energy efficiency in a highly dynamic and uncertain marine environment.

DETAILED DESCRIPTION OF THE EMBODIMENTS

The present application will be described in detail with the attached drawings and specific embodiments. This embodiment is implemented on the premise of the technical scheme of the present application, and the detailed implementation and specific operation process are given, but the protection scope of the present application is not limited to the following embodiments.

Embodiment 1

Figure 1:
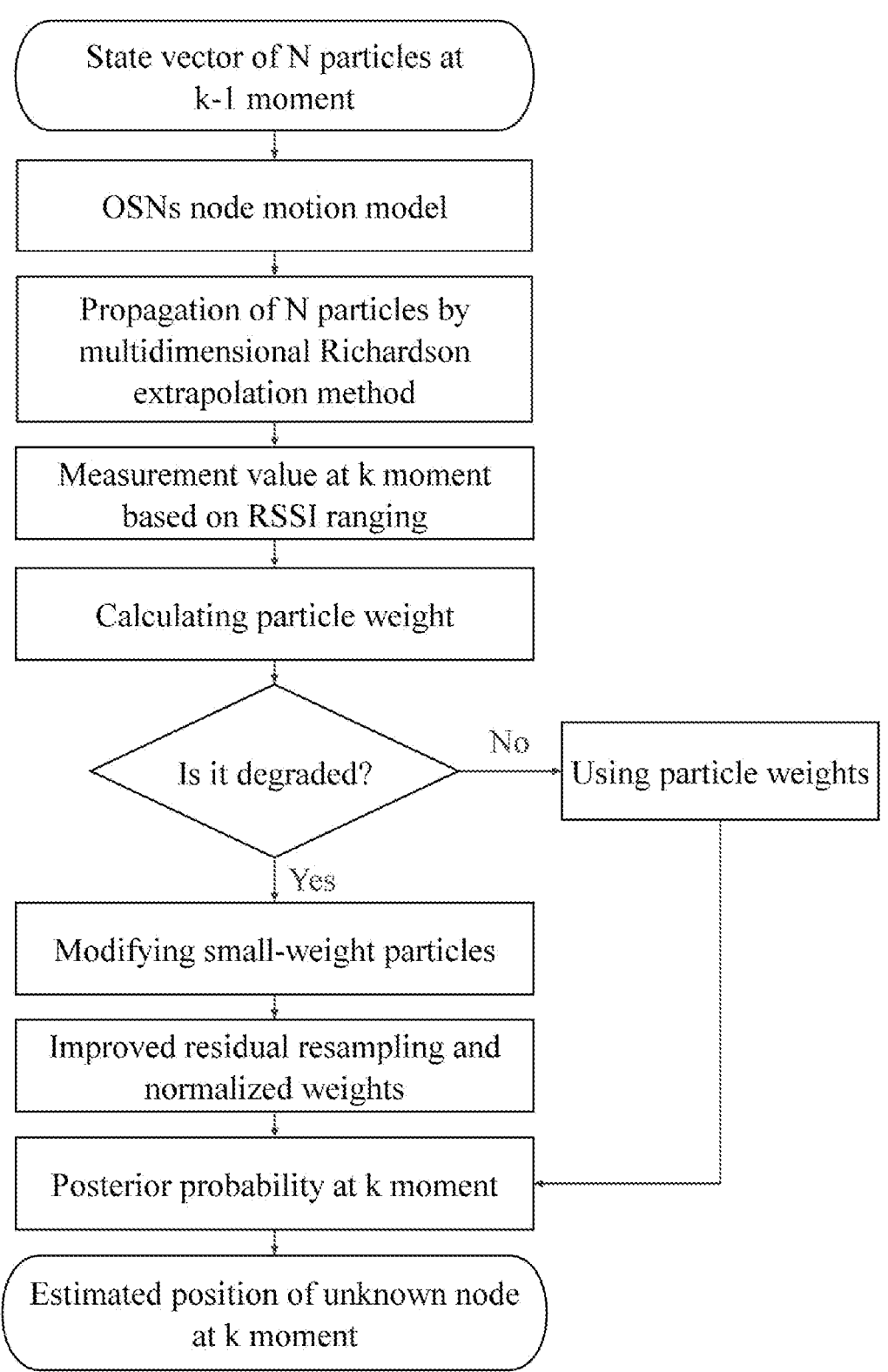
FIG. 1 is a flow chart of the present application.

The application provides a efficient particle filter node positioning method for ocean sensor networks, and the flow chart of the method is shown in FIG. 1.

The method provided by the application includes the following steps:

1) a first state vector of a mean value of a posterior probability at the k−1 moment is obtained;

2) according to the motion characteristics of the velocity field in the sea area, considering the interaction between tidal field and residual field, the state model of the nonlinear system is established;

3) based on the signal intensity attenuation model, the signal intensity received by each node in the ocean sensor networks is modeled to obtain the observation model of the nonlinear system;

4) particles are propagated, and the state vector $\bar{u}^{+}{}_{k}$ at the next moment according to the particle vector at k−1 moment is calculated;

5) the observed value is obtained and the weight is calculated;

6) it is judged that whether it is degraded, if not, the weight is used to calculate the position expectation, otherwise, 7) is executed;

7) small-weight particles are modified;

8) the improved residual is resampled and the weights are normalized; and 9) the weight of 8) is used to calculate the position expectation and realize node positioning.

In the 2), considering that most of the current OSNs are used in offshore areas, the water flow velocity is relatively gentle, and the movement of nodes in OSNs in the water flow is not completely random under certain circumstances, therefore, the motion model of nodes is established by using the inherent temporal and spatial correlation, and it is assumed that the velocity field of the node movement environment is composed of tidal field and residual field. The tidal field oscillates uniformly in one direction, and the residual flow field is a wireless sequence that rotates alternately clockwise and counterclockwise. The coordinate system of sea surface nodes is established, and the X axis and Y axis are perpendicular to the coast and along the coast respectively. This motion model is expressed as follows:

$$V_x = k_1\lambda v\sin(k_2 x)\cos(k_3 y) + k_1\lambda\cos(2k_1 t) + k_4 \qquad (1)$$

$$V_y = -\lambda v\cos(k_2 x)\sin(k_3 y) + k_5$$

Where $V_x$ and $V_y$ represent the velocities of nodes in OSNs in the X-axis and Y-axis directions respectively; $\lambda$ is the ratio of tidal range to residual vortex diameter; $v$ represents the corresponding velocity; $k_1$, $k_2$ and $k_3$ are constant terms, and the values are related to environmental factors such as tide, salinity and temperature, and these parameters will change when the nodes are deployed in different sea areas. $k_4$ and $k_5$ are random parameters of Gaussian distribution.

Combined with the motion model of formula (1), the node state equation of nonlinear dynamic system is established, that is, the state model, and the motion equation is rewritten as a differential motion equation, which is expressed as:

$$\dot{u}_t = \begin{bmatrix} \dot{x}_t \\ \dot{y}_t \end{bmatrix} = \begin{bmatrix} V_x \\ V_y \end{bmatrix} = \begin{bmatrix} k_1\lambda v\sin(k_2 x_t)\cos(k_3 y_t) + k_1\lambda\cos(2k_1 t) + k_4 \\ -\lambda v\cos(k_2 x_t)\sin(k_3 y_t) + k_5 \end{bmatrix} + \begin{bmatrix} \alpha_t^1 \\ \alpha_t^2 \end{bmatrix} \qquad (2)$$

where $\dot{u}_t$ represents the state of the node;

$$\alpha_t^1$$

and $$\alpha_t^2$$

represent the process noise in the X-axis and Y-axis directions, respectively, and the values of $$\alpha_t^1$$

and $$\alpha_t^2$$

obey the normal distribution with a mean value of 0 and a standard deviation of Q.

In the 3), considering the special environment of the ocean and the requirement of low cost, the signal intensity attenuation model (Received Signal Strength Indicator, RSSI) does not need complicated hardware, and the communication cost is low, therefore, the ranging method based on RSSI is used to locate the OSNs node, and the distance between the unknown node and the anchor node at the current moment is estimated by using the signal receiving power of the unknown node at the k moment and the signal transmitting power of the anchor node at the k moment, where the RSSI received by the unknown node at the k moment may be expressed by the lognormal shadow model:

$$P_r^k = P_e^k - PL(d_0) - 10\vartheta \log_{10} \frac{d}{d_0}, \tag{3}$$

where $$P_r^k$$

and $$P_e^k$$

respectively represent the RSSI value received by the node and the transmitting power of the anchor node at the k moment; $d_0$ is the reference distance, usually set to 1 m; $PL(d_0)$ represents the loss value of RSSI when the distance is $d_0$; d represents the distance between the unknown node and the anchor node at the k moment; $\theta$ represents the path loss index (PLE), which is determined by the signal propagation environment.

Let $$P_0^k = P_e^k - PL(d_0), \ d_0 = 1, \ z_t = P_r^k$$

this application considers uncoordinated positioning, so the observation model of nonlinear dynamic system is:

$$z_k = P_0^k - 10\vartheta \log_{10} d + \beta_k, \tag{4}$$

where $\beta_k$ is the measurement noise at the k moment, and the value obeys Gaussian distribution with 0 mean and R standard deviation.

In the 4), the state at the k moment is assumed to be known, the state at the k moment is predicted according to the state equation, and the target position is estimated by an efficient particle filter method in combination with the ranging model at the k moment. In the traditional particle filter, the state vectors of N particles at k−1 moment are calculated by state transition equations respectively. In the particle propagation stage, the method of the application firstly calculates the state vector $\bar{u}^+_k$ at the next moment according to the state vector $\bar{u}^+_{k-1}$ of the mean value of the posterior probability at k−1 moment:

$$\bar{u}^+_k = F(\bar{u}^+_{k-1}, \alpha_{k-1}) \tag{5}$$

The state vector of the i-th particle at the k−1 moment is represented by the mean value of the posterior probability at the k−1 moment, which may be written as:

$$u_{k-1}^i = \bar{u}^+_{k-1} + \Delta u^i, \ (i = 1, 2, 3, \ldots, N) \tag{6}$$

Then all the particle state vectors $u_k^i$ at the k moment may be approximated by Taylor expansion at $\bar{u}^+_{k-1}$:

$$u_k^i = F\left(u_{k-1}^i, \alpha_{k-1}\right) \tag{7}$$
$$= F\left(\bar{u}^+_{k-1} + \Delta u^j, \alpha_{k-1}\right)$$
$$= F(\bar{u}^+_{k-1}, \alpha_{k-1}) + \frac{\partial F}{\partial u}\bigg|_{\bar{u}^+_{k-1}} \left(\Delta u^i\right) + \frac{\frac{\partial^2 F}{\partial u^2}\big|_{\bar{u}^+_{k-1}} \left(\Delta u^i\right)^2}{2!} +$$
$$\frac{\frac{\partial^3 F}{\partial u^3}\big|_{\bar{u}^+_{k-1}} \left(\Delta u^i\right)^3}{3!} + \ldots$$

To simplify equation (7), letting $$D_{\Delta u^i} F \big|_{\bar{u}^+_{k-1}} = \frac{\partial F}{\partial u}\bigg|_{\bar{u}^+_{k-1}} \Delta u^i,$$

then equation (7) may be rewritten as:

$$u_k^i = \tag{8}$$
$$F(\bar{u}^+_{k-1}, \alpha_{k-1}) + D_{\Delta u^i} F \big|_{\bar{u}^+_{k-1}} + \frac{D^2_{\Delta u^i} F \big|_{\bar{u}^+_{k-1}}}{2!} + \frac{D^3_{\Delta u^i} F \big|_{\bar{u}^+_{k-1}}}{3!} + \ldots$$

Where the function F is:

$$F(u_k, \alpha_k) = u_{k-1} + \int_t^{t+\delta t} f(u_{k-1}, \alpha_{k-1}) dt \tag{9}$$

Taylor expansion avoids using numerical analysis to calculate the state vectors of all particles at the next moment, and approximates the state vectors of all sampled particles to a first-order Taylor series term, which may be expressed as a function of $\Delta u^i$, as shown in the following formula:

$$N_1\left(\Delta u^i\right) = F(\bar{u}^+_{k-1}, \alpha_{k-1}) + D_{\Delta u^i} F \big|_{\bar{u}^+_{k-1}} \tag{10}$$
$$= F(\bar{u}^+_{k-1}, \alpha_{k-1}) + \frac{\partial F}{\partial u}\bigg|_{\bar{u}^+_{k-1}} \Delta u^i$$

According to Equation (8) and Equation (10), the state vectors of all particles that approximate to the first-order Taylor series term at the k moment may be obtained:

$$u_k^i = N_I(\Delta u^i) + \frac{D_{\Delta u^i}^2 F \mid_{\overline{u}_{k-1}^+}}{2!} + \frac{D_{\Delta u^i}^3 F \mid_{\overline{u}_{k-1}^+}}{3!} + \ldots \tag{11}$$

$$= N_I(\Delta u^i) + \left[ \frac{D_{\Delta u^i}^2}{2!} + \frac{D_{\Delta u^i}^3}{3!} + \ldots \right] F \mid_{u_{k-1}^+} \qquad 5$$

However, the precision of the state vector based on the first-order Taylor series expansion term is not ideal, that is, the precision of formula (11) is not ideal. In order to further 10 improve the precision of the state vector and improve the precision of all sampled particle state vectors at the k moment to the second-order Taylor series term, the application uses the idea of multidimensional Richardson extrapolation to use Taylor expansion in two steps. The 15

$$u_k^i$$

20 begins with Taylor expansion from $$\overline{u}_{k-1}^+ + \frac{\Delta u^i}{2} :$$

25

$$u_k^i = F(u_{k-1}, \alpha_{k-1}) \tag{12}$$

$$= F\left( \overline{u}_{k-1}^+ + \frac{\Delta u^i}{2} + \frac{\Delta u^i}{2}, \alpha_{k-1} \right)$$

$$= F\left( \overline{u}_{k-1}^+ + \frac{\Delta u^i}{2}, \alpha_{k-1} \right) + \frac{\partial F}{\partial u} \Big|_{\overline{u}_{k-1}^+ + \frac{\Delta u^i}{2}} \left( \frac{\Delta u^i}{2} \right) + \frac{\frac{\partial^2 F}{\partial u^2} \Big|_{\overline{u}_{k-1}^+ + \frac{\Delta u^i}{2}} \left( \frac{\Delta u^i}{2} \right)^2}{2!} + \frac{\frac{\partial^3 F}{\partial u^3} \Big|_{\overline{u}_{k-1}^+ + \frac{\Delta u^i}{2}} \left( \frac{\Delta u^i}{2} \right)^3}{3!} + \ldots$$

$$= F\left( \overline{u}_{k-1}^+ + \frac{\Delta u^i}{2}, \alpha_{k-1} \right) + \left[ D_{\Delta u^i/2} + \frac{D_{\Delta u^i/2}^2}{2!} + \frac{D_{\Delta u^i/2}^3}{3!} + \ldots \right] F \Big|_{\overline{u}_{k-1}^+ + \frac{\Delta u^i}{2}}$$

Then Taylor expansion of

50

$$F\left( \overline{u}_{k-1}^+ + \frac{\Delta u^i}{2}, \alpha_{k-1} \right)$$

in Equation (12) is performed at $\overline{u}_{k-1}^+$:

$$F\left( \overline{u}_{k-1}^+ + \frac{\Delta u^i}{2}, \alpha_{k-1} \right) = F(\overline{u}_{k-1}^+, \alpha_{k-1}) + \frac{\partial F}{\partial u} \Big|_{\overline{u}_{k-1}^+} \left( \frac{\Delta u^i}{2} \right) + \frac{\frac{\partial^2 F}{\partial u^2} \Big|_{\overline{u}_{k-1}^+} \left( \frac{\Delta u^i}{2} \right)^2}{2!} + \frac{\frac{\partial^3 F}{\partial u^3} \Big|_{\overline{u}_{k-1}^+} \left( \frac{\Delta u^i}{2} \right)^3}{3!} + \ldots \tag{13}$$

$$= F(\overline{u}_{k-1}^+, \alpha_{k-1}) + D_{\Delta u^i/2} F \Big|_{\overline{u}_{k-1}^+} + \left[ D_{\Delta u^i/2} + \frac{D_{\Delta u^i/2}^2}{2!} + \frac{D_{\Delta u^i/2}^3}{3!} + \ldots \right] F \Big|_{\overline{u}_{k-1}^+}$$

According to Equation (12) and Equation (13), the following equation may be obtained:

$$u_k^i = F(\overline{u}_{k-1}^+ +, \alpha_{k-1}) + D_{\Delta u^i/2}F \mid_{\overline{u}_{k-1}^+} + \tag{14}$$

$$D_{\Delta u^i/2}F \mid_{\overline{u}_{k-1}^+ + \frac{\Delta u^i}{2}} + \left[\frac{D_{\Delta u^i/2}^2}{2!} + \frac{D_{\Delta u^i/2}^3}{3!} + \dots\right]F \mid_{\overline{u}_{k-1}^+} +$$

$$\left[\frac{D_{\Delta u^i/2}^2}{2!} + \frac{D_{\Delta u^i/2}^3}{3!} + \dots\right]F \mid_{u_{k-1}^+ + \frac{\Delta u^i}{2}},$$

in the equation, $$D_{\Delta u^i/2}F = \frac{\partial F}{\partial u}\left(\frac{\Delta u^i}{2}\right) = \frac{1}{2}D_{\Delta u^i}F,$$

so the above equation may be rewritten as:

$$u_k^i = F(\overline{u}_{k-1}^+ +, \alpha_{k-1}) + D_{\Delta u^i/2}F \mid_{\overline{u}_{k-1}^+} + \tag{15}$$

$$D_{\Delta u^i/2}F \mid_{\overline{u}_{k-1}^+ + \frac{\Delta u^i}{2}} + \left[\frac{1}{2^2}\frac{D_{\Delta u^i}^2}{2!} + \frac{1}{2^3}\frac{D_{\Delta u^i}^3}{3!} + \dots\right]F \mid_{\overline{u}_{k-1}^+} +$$

$$\left[\frac{1}{2^2}\frac{D_{\Delta u^i}^2}{2!} + \frac{1}{2^3}\frac{D_{\Delta u^i}^3}{3!} + \dots\right]F \mid_{\overline{u}_{k-1}^+ + \frac{\Delta u^i}{2}}.$$

Let:

$$N_2\left(\frac{\Delta u^i}{2}\right) = F(\overline{u}_{k-1}^+ +, \alpha_{k-1}) + D_{\Delta u^i/2}F \mid_{\overline{u}_{k-1}^+} + D_{\Delta u^i/2}F \mid_{\overline{u}_{k-1}^+ + \frac{\Delta u^i}{2}} \tag{16}$$

Then equation (15) may be abbreviated as:

$$u_k^i = N_2\left(\frac{\Delta u^i}{2}\right) + \left[\frac{1}{2^2}\frac{D_{\Delta u^i}^2}{2!} + \frac{1}{2^3}\frac{D_{\Delta u^i}^3}{3!} + \dots\right]F \mid_{\overline{u}_{k-1}^+} + \tag{17}$$

$$\left[\frac{1}{2^2}\frac{D_{\Delta u^i}^2}{2!} + \frac{1}{2^3}\frac{D_{\Delta u^i}^3}{3!} + \dots\right]F \mid_{\overline{u}_{k-1}^+ + \frac{\Delta u^i}{2}}.$$

Because:

$$F(\overline{u}_{k-1}^+, \alpha_{k-1}) \approx F\left(\overline{u}_{k-1}^+ + \frac{\Delta u^i}{2}, \alpha_{k-1}\right)$$

Therefore, equation (17) may be approximately rewritten as:

$$u_k^i = N_2\left(\frac{\Delta u^i}{2}\right) + \left[\frac{1}{2}\frac{D_{\Delta u^i}^2}{2!} + \frac{1}{2^2}\frac{D_{\Delta u^i}^3}{3!} + \dots\right]F \mid_{\overline{u}_{k-1}^+}. \tag{18}$$

According to equation (10) and equation (18), the following equation:

$$u_k^i = 2N_2\left(\frac{\Delta u^i}{2}\right) - N_1(\Delta u^i) - \left[\frac{1}{2}\frac{D_{\Delta u^i}^3}{3!} + \frac{3}{4}\frac{D_{\Delta u^i}^4}{4!} + \dots\right]F \mid_{\overline{u}_{k-1}^+}. \tag{10}$$

Therefore, the state vectors of particle at the k moment may be approximated as:

$$u_k^i \approx 2N_2\left(\frac{\Delta u^i}{2}\right) - N_1(\Delta u^i). \tag{20}$$

Then $$\frac{\partial F}{\partial u}$$

may be quickly calculated:

$$\frac{\partial F}{\partial u} = e^{\mathcal{J}\Delta k}, \tag{21}$$

in the formula, $\mathcal{J}$ is the Jacobian matrix of the function f at $\overline{u}^+_{k-1}$, and the state vectors of all the sampled particles may be obtained by calculating the Jacobian matrix at each moment. Through the above analysis, the application uses the multidimensional Richardson extrapolation method, and only needs to calculate the state vector of the last moment's posterior mean value through the state transition equation to calculate the state vector of the next moment. According to the obtained state vector, the state vectors of all sampled particles at this moment are obtained, and the accuracy of the second-order Taylor series term is maintained.

In the 5), $q(u_{1:k}|z_{1:k})$ is used as the importance density to represent the posterior distribution of all past moments, where $u_{1:k}=\{u_1, u_2, \dots, u_k\}$, and the following equation may be obtained after a decomposition:

$$q(u_{1:k} \mid z_{1:k}) = q(u_{1:k-1} \mid z_{1:k-1})q(u_k \mid u_{1:k-1}, z_{1:k}). \tag{22}$$

Subsequently, the recursive form of posterior probabilities $p(u_{1:k}|z_{1:k})$ of states at all moments in the past may be derived:

$$\begin{aligned} p(u_{1:k} \mid z_{1:k}) &= \frac{p(z_k \mid u_{1:k}, z_{1:k-1})p(u_{1:k} \mid z_{1:k-1})}{p(z_k \mid z_{1:k-1})} \\ &= \frac{p(z_k \mid u_{1:k}, z_{1:k-1})p(u_k \mid u_{1:k-1}, z_{1:k-1})p(u_{1:k-1} \mid z_{1:k-1})}{p(z_k \mid z_{1:k-1})} \\ &= \frac{p(z_k \mid u_k)p(u_k \mid u_{k-1})p(u_{1:k-1} \mid z_{1:k-1})}{p(z_k \mid z_{1:k-1})} \\ &\propto p(z_k \mid u_k)p(u_k \mid u_{k-1})p(u_{1:k-1} \mid z_{1:k-1}) \end{aligned} \tag{23}$$

Taking $q(u_k|u_{k-1},z_k)=p(u_k|u_{k-1})$ as the sub-optimal case of $q(\cdot)$, the recursive equation of sampling particle weight is:

$$w_k^{(i)} \propto w_{k-1}^{(i)} \frac{p(z_k|u_k^{(j)})p(u_k^{(j)}|u_{k-1}^{(j)})}{p(u_k^{(j)}|u_{k-1}^{(j)})} = w_{k-1}^{(j)} p(z_k|u_k^{(j)}). \tag{24}$$

According to this method, at the k moment, the weight of each sampled particle $$u_k^{(i)} \sim p(u_k|u_{k-1}^{(i)})(u_1^{(i)} \sim p(u_1))$$

when k=1) at the k moment may be calculated recursively according to the likelihood function and the normalized weight at the k−1 moment as follows:

$$w_k^{(i)} \propto \hat{w}_{k-1}^{(i)} p(z_k|u_k^{(i)}), \tag{25}$$

where $$\hat{w}_{k-1}^{(i)}$$

is the weight of the normalized i-th particle:

$$\hat{w}_{k-1}^{(i)} = \frac{w_{k-1}^{(i)}}{\sum_{i=1}^{N} w_{k-1}^{(i)}}. \tag{26}$$

In the 6), in order to judge whether the particle filter is degraded, the number of effective particles is judged according to the dispersion of the weights of the sampled particles. The more dispersed the weights are, the greater the variance of the weight values is, indicating that the weight values of the current particle set are concentrated on a few particles, and the more serious the particle degradation is. Specifically, $N_{eff}$ is used to represent the number of effective particles, that is, $$N_{eff} \approx \frac{1}{\sum_{i=1}^{N} (w_k^{(i)})^2}. \tag{27}$$

If the $N_{eff}$ is less than the set threshold, it is considered that there is a degradation problem, and the small-weight particles need to be modified.

In the 7), although Taylor series expansion combined with Richardson extrapolation method is used to achieve efficient particle propagation, particles often encounter the problem of dilution. Therefore, by changing the state vector of the small-weight particles, the application enables the small-weight particles to obtain larger weights, thereby promoting the weight of the whole particle set to be more uniform. After resampling is required according to the preset threshold, before modifying the small-weight particles, the whole particle set is divided into small-weight particle sets and large-weight particle sets, and the particle sets are divided into two categories according to the difference of the weights of the two sets:

$$u_k^{(i)} = \begin{cases} S_l, & w_k^i < W_{thres} \\ S_h, & w_k^i \geq W_{thres} \end{cases}, \tag{28}$$

In the formula, the set $S_l$ and set $S_h$ are used to store all small-weight particles and all large-weight particles, respectively, and $W_{thres}$ represents the weight threshold of particle set segmentation. In order to obtain this threshold, N sampled particles are sorted in ascending order according to the weight, and N particles are stored by set W:

$$\bar{S} = \{\bar{w}_k^1, \bar{w}_k^2, \dots, \bar{w}_k^N\}, \tag{29}$$

where:

$$\bar{w}_k^1 \leq \bar{w}_k^2 \leq \dots \leq \bar{w}_k^N.$$

If the weight of the r-th particle is taken as the segmentation weight, then the weight value difference between the small-weight particle set and the large-weight particle set is:

$$E_r = \sum_{i=1}^{r} \bar{w}_k^i - \sum_{i=1+r}^{N} \bar{w}_k^i, \tag{30}$$

$E_r$ is calculated from the first particle in the set $\bar{S}$. When $E_r>0$, take the weight of the r particle in the set S as the weight threshold of segmentation.

$$W_{thres} = \bar{W}(r), \tag{31}$$

where $\bar{W}(r)$ represents the weight of the r particle in the set W. After each particle is divided into large-weight particle set Shand small-weight particle set $S_l$ by equations (29), (30) and (31), the state vector and weight value of particles in large-weight particle set $S_h$ are kept unchanged, and the state vector of particles in small-weight particle set $S_l$ is modified by using the state vector and weight value of particles in large-weight particle set $S_h$.

$$S_h \cdot u_{kl}^s$$

represents the state vector of the s-th particle to be modified in the small-weight particle set $S_1$, and $$u_{kh}^j$$

represents the state vector of the j-th particle in the large-weight particle set Sh. Then the modified state vector $$u_{km}^s$$

17 of the s-th particle in the small-weight particle set is obtained by the linear interpolation method:

$$u_{km}^s = \frac{w_{kl}^s u_{kl}^s + w_{kh}^j u_{kh}^j}{w_{kl}^s + w_{kh}^j}, \tag{32}$$

where $$w_{kl}^s$$

represents the weight value of the s-th small-weight particle in the small-weight particle set $S_l$, $$w_{kh}^j$$

represents the weight of the j-th large-weight particle in the large-weight particle set $S_h$, s=1, 2, . . . , $N_l$ and j=1, 2, . . . , $N_h$, $N_l$ and $N_h$ respectively represent the number of particles in the sets $S_l$ and $S_h$, and each large-weight particle used for modifying small-weight particles is randomly selected from the large-weight particle set $S_h$, and the modified small-weight particle weight is updated as follows according to the equation $$w_k^{(i)} \propto \tilde{w}_{k-1}^{(i)} p\left(z_k \mid u_k^{(i)}\right):$$

$$w_k^s = w_{k-1}^s(z_k \mid u_{km}^s), \tag{33}$$

where, $$w_{k-1}^s$$

represents the weight value of the s-th small-weight particle at k−1 moment in the small-weight particle set $S_l$. When the state vectors and weights of all the small-weight particles are updated, the new small-weight particles and all the large-weight particles in the set $S_h$ are combined into N new particles and the weights are normalized.

In the 8), according to the modified particles, a residual resampling method of a new particle replication mode is further proposed, and a new replicated particle set $$\bar{U}_k^i$$

18 is generated for the i-th particle to be replicated by the following methods:

$$\begin{cases} \bar{U}_k^i = \{u_k^i\}; C_k^i = 1 \\ \bar{U}_k^i = \{u_k^i, u_k^i\}; C_k^i = 2 \\ \bar{U}_k^i \{u_k^i, u_k^i(1 \pm \Delta h^g)\}; g = 1, 2, \ldots, p; C_k^i = 2p+1; p > 0 \\ \bar{U}_k^i = \{u_k^i, u_k^i, u_k^i(1 \pm \Delta h^g)\}; g = 1, 2, \ldots, p; C_k^i = 2p+2; p > 0 \end{cases}, \tag{34}$$

where $\Delta h^g$ is the deviation value between the new particle state vector generated according to $$u_k^i \text{ and } u_k^j,$$

which is:

$$\Delta h^g = \gamma^i e^{-\frac{2g-1}{p}}, g = 1, 2, \ldots, \left\lfloor \frac{c_k^i - 1}{2} \right\rfloor, \tag{35}$$

on the formula, $\gamma^i$ is used to adjust the dispersion degree of the i-th particle that needs to be resampled. In order to make the resampled particles express more areas in the posterior distribution as much as possible, the overlap between the states of new resampled particles should be minimized. According to equation (34), when $$C_k^i > 2, \Delta h^1$$

represents the maximum deviation value for the i-th particle to be replicated, and the i-th particle $\Delta h^1$ to be replicated may be less than half of the average difference of state vectors between the i-th particle to be replicated and all other particles to be replicated, and $\gamma^i$ for the i-th particle to be replicated is:

$$0 < \gamma^i e^{-\frac{1}{p}} < \frac{\min\left(\left|1 - \frac{u_k^j}{u_k^i}\right|\right)}{p}, j = 1, \ldots, N, j \neq i, \tag{36}$$

where $$u_k^i$$

represents the state vector of the i-th resampled particle that needs to be replicated more than 2 times, and $$u_k^j$$

represents the state vectors of all the selected resampled particles except the i-th particle. Inequality (36) may be rewritten as:

$$0 < \gamma^i < \frac{1}{2p} e^{\frac{1}{p}} \min\left(\left|1 - \frac{u_k^j}{u_k^i}\right|\right), j = 1, \ldots, N, j \neq i. \tag{37}$$

In the 9), according to the new particle set and combining the weights, the posterior probability distribution of unknown nodes is further estimated jointly, that is $$p(u_k \mid z_{1:k}) \approx \sum_{i=1}^{N} \tilde{w}_k^{(i)} \delta(\overline{U}_k - \overline{U}_k^i), \qquad (38)$$

where $$\tilde{w}_k^{(i)}$$

is the modified normalized particle weight.

Finally, according to the obtained posterior probability distribution, the position of the target node is further estimated, that is $$E(u_k \mid z_{1:k}) = \int p(u_k \mid z_{1:k}) \cdot \overline{U}_k d\overline{U}_k \approx \sum_{i=1}^{N} \tilde{w}_k^{(i)} \overline{U}_k^i, \qquad (39)$$

where $E(u_k \mid z_{1:k})$ represents the expected value of the position.

In order to further verify the performance of the method in positioning efficiency, the improved efficiency index is expressed according to the calculation time percentage, that is $$C_{HRT-PF} = \frac{T_{PF} - T_{HE-PF}}{T_{PF}} \times 100\%, \qquad (40)$$

where $C_{HRT-PF}$ represents the corresponding improved performance index; $T_{PF}$ represents the calculation time of the original particle filter; $T_{HE-PF}$ represents the calculation time of the high-efficiency particle filter proposed by the present application.

Figure 2:
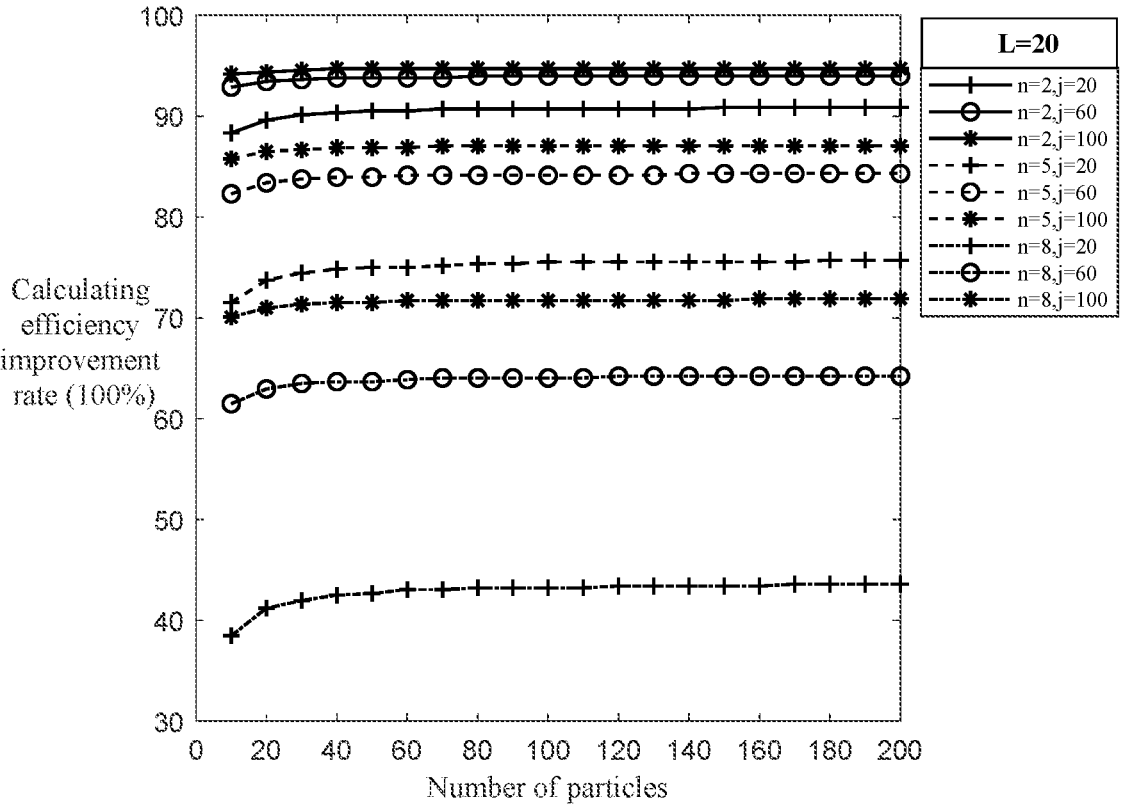
FIG. 2 shows the improvement rate of the prediction step relative to the PF calculation time when the propagation times are 20.
Figure 3:
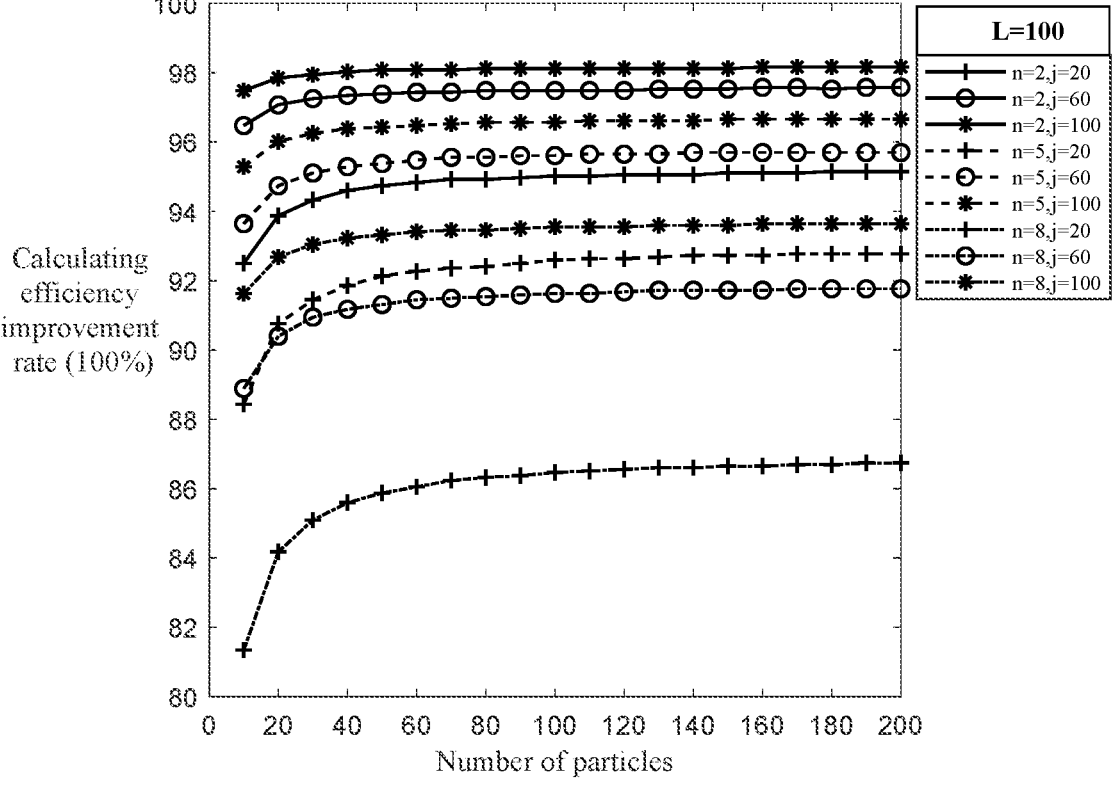
FIG. 3 shows the improvement rate of the prediction step relative to the PF calculation time when the propagation times are 100.

FIG. 2 and FIG. 3 show the relationship between the improvement rate of the prediction step of the application (Improved High-efficiency Particle Filter, IHE-PF) relative to the calculation time of the original particle filter (PF) and the number of particles N, the dimension of the state vector n and the number of basic operations required to calculate the differential motion equation f when the particle propagation times L are 20 and 100 respectively. From the drawings, it can be found that with the increase of particle number, the improvement rate of IHE-PF relative to PF's calculation time will also increase rapidly, and the highest improvement rate of its calculation time may be reached when the particle number is small. From the comparison between FIG. 2 and FIG. 3, it can be seen that with the increase of particle propagation times L, the improvement rate of IHE-PF relative to the calculation time of PF will increase, and the upper improvement limit will also increase. Meanwhile, with the increase of the number of basic operations j needed to calculate the differential motion equation f, the improvement rate of the calculation time of HE-PF relative to PF will increase, and the upper improvement limit will also increase. However, with the increase of state vector dimension n, the improvement rate of IHE-PF relative to PF calculation time will decrease, and the upper limit of the improvement rate will also decrease. Through the above analysis, it can be concluded that the more complicated the calculation, the higher the improvement rate of IHE-PF relative to the calculation time of PF, and the complexity determines the upper limit of the improvement efficiency.

Figure 4:
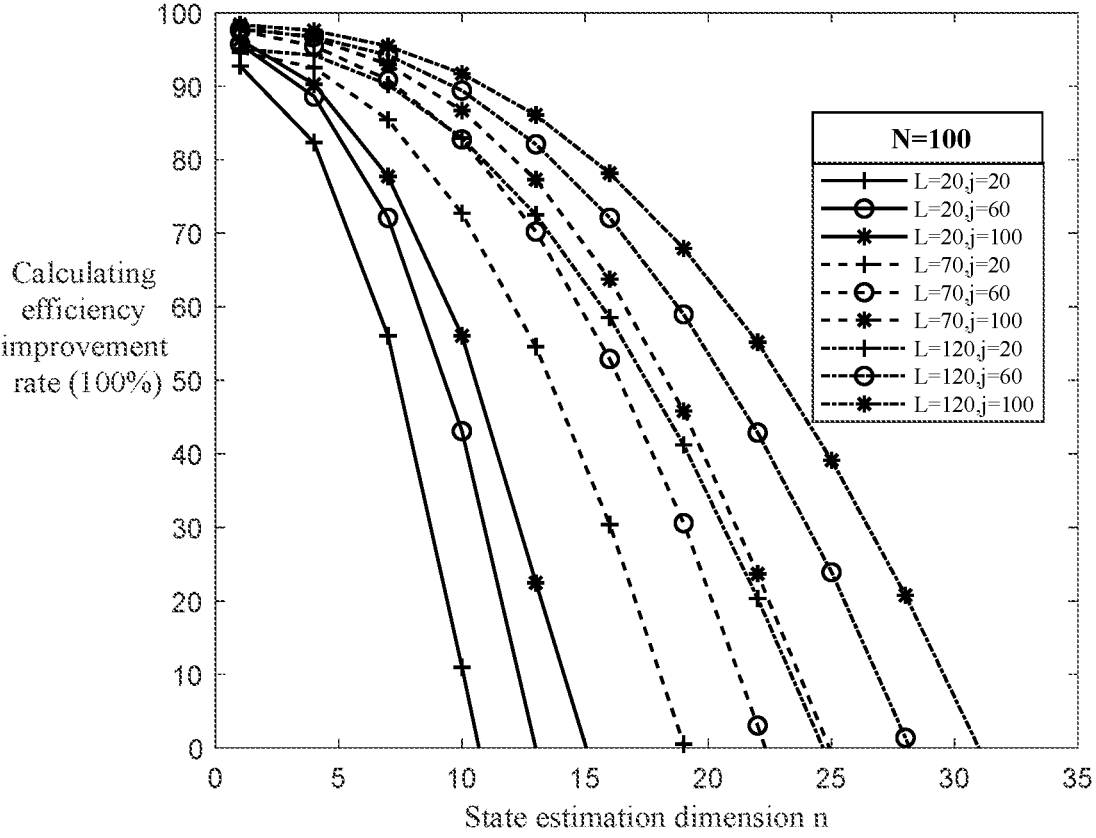
FIG. 4 shows the influence of the dimension n of the state vector on the calculation efficiency improvement rate of the method of the present application when the number of particles is 100.
Figure 5:
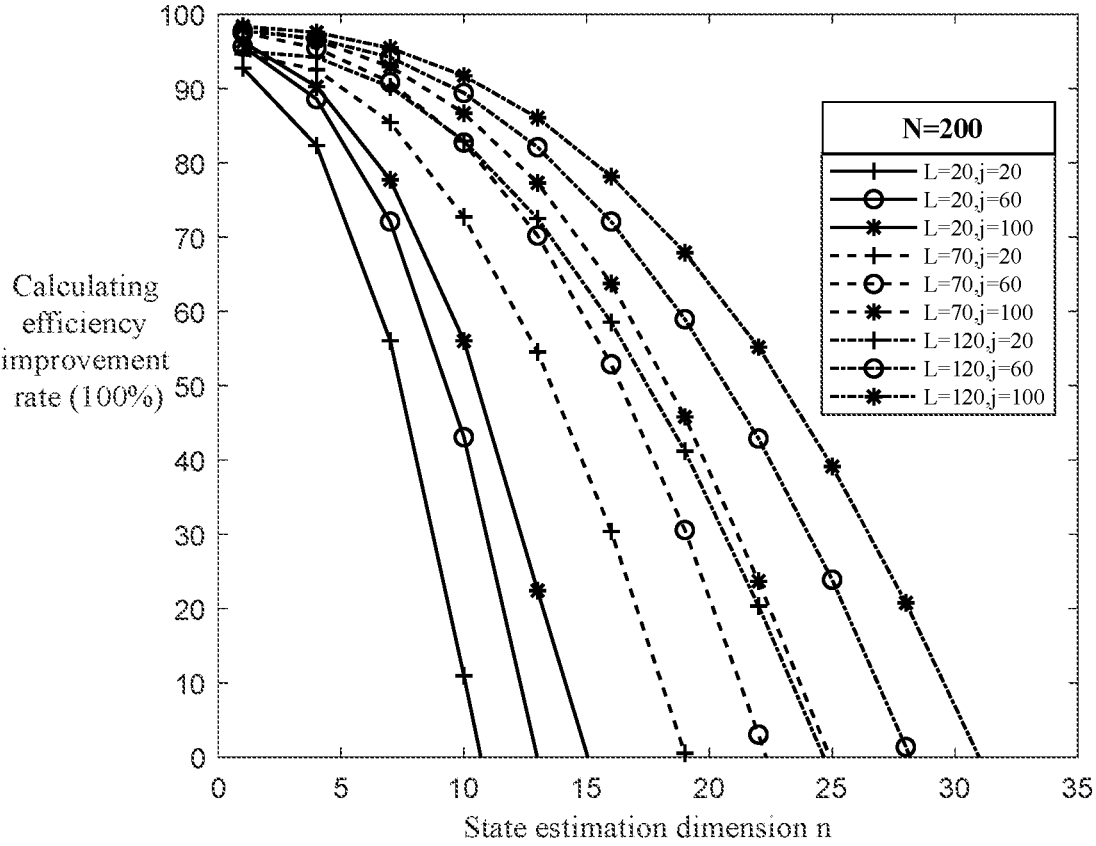
FIG. 5 shows the influence of the dimension n of the state vector on the calculation efficiency improvement rate of the method of the present application when the number of particles is 200.

However, according to equation (40), it can be found that the state vector dimension n is cubic and quadratic for $T_{HRT-PF}$, and it is first power for $T_{PF}$. Therefore, when the state vector dimension n increases indefinitely, the numerator will be less than 0, that is, the calculation efficiency of the prediction step of IHE-PF will not be better than that of PF. FIG. 4 and FIG. 5 show the limitation of the dimension n of the state vector on the improvement rate of the calculation time of the IHE-PF prediction step when the number of particles is 100 and 200, respectively. As can be seen from FIG. 4 and FIG. 5, with the increase of the number N of particles, the limitation of the dimension n of the state vector on the calculation time improvement rate of IHE-PF relative to PF prediction step remains unchanged. With the increase of particle propagation times L or the number of basic operations j needed to calculate differential motion equation f, the limit value of state vector dimension n that makes the calculation time of IHE-PF prediction step better than PF will also increase, and the state vector dimension n directly determines whether the calculation time of HE-PF in prediction step is better than PF. For the OSNs location problem, the dimension of the state vector in this paper is 2, so the prediction step of IHE-PF may maintain a high computational efficiency compared with PF. Through the above analysis, according to the changes of particle propagation times L, particle number N and the basic operation number j required to calculate the differential motion equation f, the calculation time of the traditional PF prediction step may be improved by more than 90% by using HE-PF. Although the upper limit of the improvement rate is limited by the required state vector dimension n, the number of state variables in the OSNs positioning problem is usually 2 to 4, which is less than the limited number. Therefore, the calculation efficiency of the OSNs node positioning algorithm based on IHE-PF may be improved by more than 90% compared with PF, and the real-time monitoring of the marine environment may be realized.

In order to further verify the performance of the method in positioning accuracy, a simulation experiment is carried out in MATLAB R2021 b, and three anchor nodes are set. Considering the positioning of one node, the standard deviation of process noise of the motion equation of OSNs nodes is Q=4 m, the standard deviation of measurement noise of the measurement equation is R=2 dB, and the number of particles is N=300. Compared with the original particle filter (PF), the method (IHE-PF) and the unscented Kalman filter (UKF) algorithm provided by the application are respectively compared. In addition, in order to further verify that the method of the application may improve the positioning accuracy in the aspect of resampling improvement, Taylor-level expansion and multidimensional Richardson extrapolation provided by the method of the application are adopted in the particle propagation stage, but the original importance resampling method is applied in the resampling node, which is called High-efficiency Particle Filter (HE-PF) for short.

Figure 6:
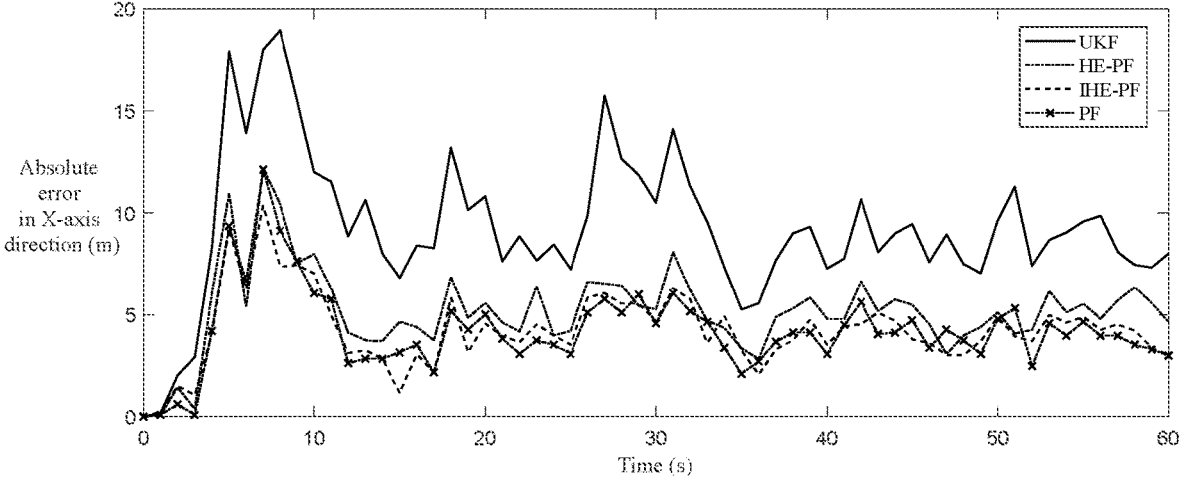
FIG. 6 is a positioning error diagram of different algorithms in the X-axis direction.
Figure 7:
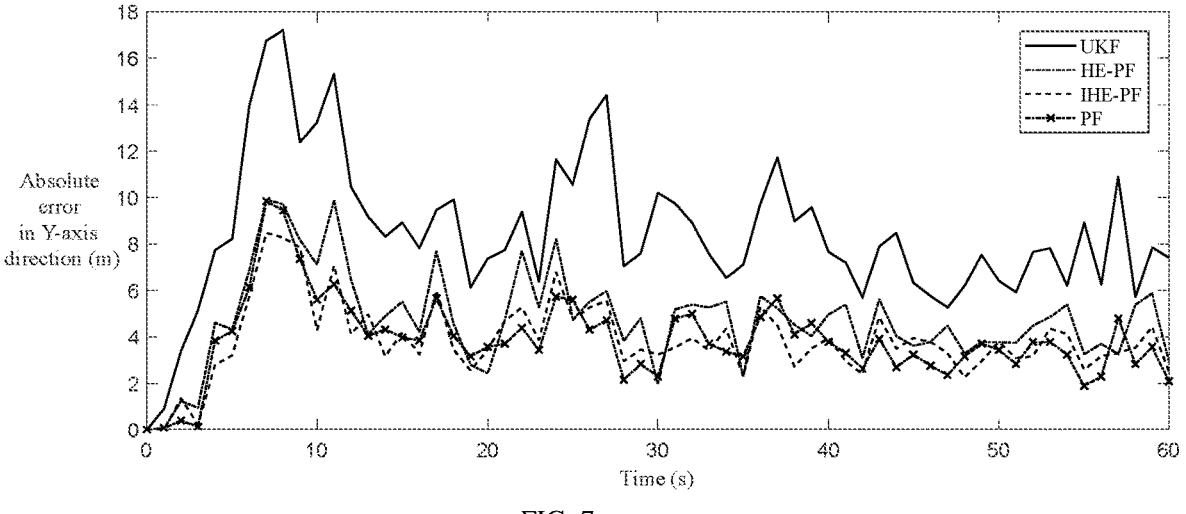
FIG. 7 is a positioning error diagram of different algorithms in the Y-axis direction.

FIGS. 6-7 respectively show the positioning errors of OSNs positioning algorithms based on PF, IHE-PF and UKF within 60 s in the X-axis and Y-axis directions. As can be seen from the drawings, after Taylor series expansion and multidimensional Richardson extrapolation, combined with the improved resampling method, the positioning error sum in the X-axis and Y-axis directions of the method provided by the application is slightly lower than that of the original PF and lower than that of the HE-PF positioning algorithm which only adopts Taylor series expansion and multidimensional Richardson extrapolation, and the UKF algorithm has larger errors in the X-axis and Y-axis directions than the other three PF-based algorithms. It can be seen that combining the improved residual resampling may effectively improve the positioning accuracy.

Figure 8:
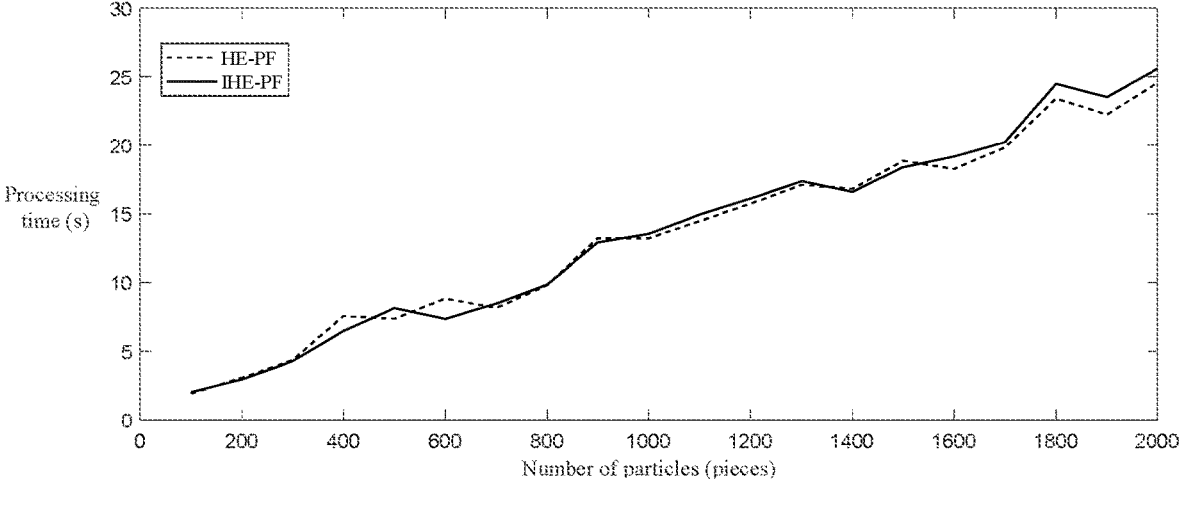
FIG. 8 shows the variation of processing time with the number of particles in the two algorithms.

In order to better improve the change of processing time of IHE-PF with residual resampling compared with HE-PF in real-time positioning, PF algorithm comparison is not added in the simulation part. FIG. 8 analyzes the change of computing time required for each 60 s real-time positioning of OSNs positioning algorithm based on IHE-PF and HE-PF with the increase of particle number. As can be seen from FIG. 8, with the increase of the number of particles, the calculation time for HE-PF and IHE-PF to complete the 60 s positioning process is similar. When the number of particles is as high as 2,000, the processing time of IHE-PF is 25.66 s, the processing time of HE-PF is 24.78 s, and the processing time of particle filter is 357.57 s. Therefore, the calculation time of THE-PF and HE-PF with improved residual resampling is basically unchanged in the real-time positioning process, but the positioning accuracy of OSNs based on IHE-PF is obviously improved.

In order to further significantly compare the calculation time and positioning accuracy, the corresponding average values are taken for comparison. As shown in Table 1, in the 60 s positioning process, the calculation time of OSNs positioning algorithm based on IHE-PF is 71.5 ms, the calculation time of HE-PF positioning algorithm is 71.4 ms, and the calculation time of PF is as high as 945 ms. The average absolute errors of PF, HE-PF and IHE-PF in the X-axis direction are 4.34 m, 5.12 m and 4.27 m, respectively. The average absolute error of PF, HE-PF and IHE-PF is 3.92 m, 4.76 m and 3.85 m, respectively, during 60 s real-time positioning. Therefore, the average absolute error of THE-PF in the x-axis direction is increased by 0.85 m compared with HE-PF and 0.07 m compared with PF. The average absolute error of IHE-PF in the X-axis direction is increased by 1.01 m compared with HE-PF and by 0.17 m compared with PF. Although the calculation time of UKF localization algorithm is 8.5 ms, its average error is 5.18 m and 4.95 m higher in X axis and Y axis than that of IHE-PF.

TABLE 1

Average positioning error and calculation schedule of PF, HE-PF and IHE-PF

| | Average calculation time per moment (ms) | Average absolute error in X-axis direction (m) | Average absolute error in Y-axis direction (m) |
|---|---|---|---|
| UKF | 8.5 | 9.45 | 8.7 |
| PF | 945 | 4.34 | 3.92 |
| HE-PF | 71.4 | 5.12 | 4.76 |
| IHE-PF | 71.5 | 4.27 | 3.75 |

Compared with PF, the calculation time of OSNs positioning algorithm based on IHE-PF is increased by 92.4%, and the positioning accuracy in X axis and Y axis is increased by 1.6% and 4.3% respectively. Compared with HE-PF, the calculation time of IHE-PF is only increased by 0.1 ms, and the positioning accuracy in X-axis and Y-axis directions is improved by 16% and 21% respectively. Compared with UKF, the calculation time of IHE-PF is increased by 63 ms, but the positioning accuracy is improved by 54.8% and 56.9% in X axis and Y axis respectively.

According to the corresponding experiments, the method of the application significantly improves the calculation efficiency of the original PF, while maintaining good positioning accuracy, and provides a feasible and efficient calculation method for the particle filter positioning method of the ocean sensor network in a highly dynamic and uncertain environment.

The preferred embodiments of the present application have been described in detail above. It should be understood that those skilled in the art may make many modifications and changes according to the concept of the present application without creative work. Therefore, any technical scheme that may be obtained by a person skilled in the technical field through logical analysis, reasoning or limited experiments on the basis of the existing technology according to the concept of the present application should be within the protection scope determined by the claims

What is claimed is:

1. An efficient particle filter node positioning method for ocean sensor networks, comprising following steps:

S1, establishing a state model of a nonlinear system according to motion characteristics of a velocity field in a sea area and considering an interaction force between a tidal field and a residual field;

S2, modeling a signal intensity received by each node in the ocean sensor networks based on a signal intensity attenuation model to obtain an observation model of the nonlinear system;

S3, obtaining a first state vector $\bar{u}^{+}_{k-1}$ of a mean value of a posterior probability at a k−1 moment, calculating a second state vector $\bar{u}^{+}_{k}$ at a k moment, representing a state vector $$u^{j}_{k-1}$$

of an i-th particle at the k−1 moment by the first state vector, and then performing a Taylor expansion on a state vector $$u^{j}_{k}$$

of the i-th particle at the first state vector $$u^{j}_{k-1}$$

to calculate second particle state vectors of all particles approximate to a first-order Taylor series term at the k moment; then, performing the Taylor expansion on the second particle state vectors in two steps by a multi-dimensional Richardson extrapolation method to obtain third particle state vectors of all the particles approximate to a second-order Taylor series term at the k moment;

S4, based on a normalized weight at the k−1 moment, calculating a normalized weight at the k moment in a recursive way, and realizing a normalization based on observed values obtained by the observation model;

S5, judging whether the particles are degraded based on a number of effective particles, if the particles are degraded based on the number of effective particles, executing S6, if the particles are not degraded based on the number of effective particles, taking the normalized weight at the k moment and a particle set at this time as a result weight and a result particle set, and executing S8;

S6, performing a resampling, then dividing a whole particle set into a small-weight particle set and a large-weight particle set according to a weight threshold, keeping state vectors and weight values of particles in the large-weight particle set unchanged, modifying state vectors of particles in the small-weight particle set, and further modifying and normalizing weights of small-weight particles to obtain modified particles, and taking modified and normalized weights of the small-weight particles as result weights;

S7, performing a residual resampling according to the modified particles to obtain a replicated particle set, and taking the replicated particle set as the result particle set; and S8, combining the result particle set and the result weight, calculating posterior probability distributions of unknown nodes at the k moment, and calculating expected values of positions according to obtained posterior probability distributions to obtain estimated positions of the unknown nodes at the k moment.

2. The efficient particle filter node positioning method for the ocean sensor networks according to claim 1, wherein the Taylor expansion in two steps specifically comprises:

performing the Taylor expansion on the second particle state vectors at $$\overline{u}_{k-1}^+ + \frac{\Delta u^i}{2},$$

and then performing the Taylor expansion on $$F\left(\overline{u}_{k-1}^+ + \frac{\Delta u^i}{2}, \alpha_{k-1}\right) \text{ at } \overline{u}_{k-1}^+,$$

wherein $\Delta u^i$ is a corresponding gradient, $\alpha_{k-1}$ is a state noise, and F is a state equation.

3. The efficient particle filter node positioning method for the ocean sensor networks according to claim 1, wherein an expression of the normalized weight at the k moment is:

$$w_k^{(i)} \propto \tilde{w}_{k-1}^{(i)} p\left(z_k \mid u_k^{(i)}\right),$$

wherein $$w_k^{(i)}$$

is a weight of the i-th particle at the k moment, $\propto$ represents a proportional sign, $$\tilde{w}_{k-1}^{(i)}$$

is a normalized weight of the i-th particle at the k−1 moment, $$p\left(z_k \mid u_k^{(i)}\right)$$

represents a posterior distribution of the i-th particle at the k moment, $z_k$ represents an observed value at the k moment, and $$u_k^{(i)}$$

represents the third particle state vector of the i-th particle at the k moment;

an expression of the normalized weight of the i-th particle at the k−1 moment is:

$$\tilde{w}_{k-1}^{(i)} = \frac{w_{k-1}^{(i)}}{\sum_{i=1}^N w_{k-1}^{(i)}},$$

wherein $$\tilde{w}_{k-1}^{(i)}$$

is the normalized weight of the i-th particle at the k−1 moment, N represents a number of the particles, and $$w_{k-1}^{(i)}$$

is a weight of the i-th particle at the k−1 moment.

4. The efficient particle filter node positioning method for the ocean sensor networks according to claim 1, wherein an expression of particle sets divided into two categories is:

$$u_k^{(i)} = \begin{cases} S_l, w_k^i < W_{thres} \\ S_h, w_k^i \ge W_{thres} \end{cases},$$

wherein $$u_k^{(i)}$$

is the third particle state vector of the i-th particle at the k moment, $S_l$ is the small-weight particle set, $S_h$ is the large-weight particle set, and $$w_k^i$$

is a modified weight of the i-th particle at the k moment, and $W_{thres}$ is the weight threshold.

5. The efficient particle filter node positioning method for the ocean sensor networks according to claim 4, wherein the step of determining the weight threshold is:

sorting all sampled particles according to the weights in a ascending order, and storing sorted particles in a set:

assuming a weight of an r-th particle as the weight threshold, obtaining an expression of a weight value difference between the small-weight particle set and the large-weight particle set: calculating the weight value difference from a first particle in the set, and when the weight value difference is greater than 0, determining a serial number r of the particle at this time to obtain the weight threshold.

6. The efficient particle filter node positioning method for the ocean sensor networks according to claim 5, wherein a linear interpolation method is adopted to modify the state vectors of the particles in the small-weight particle set, and state vectors of the modified particles of the small-weight particle set are as follows:

$$u_{km}^s = \frac{w_{kl}^s u_{kl}^s + w_{kh}^j u_{kh}^j}{w_{kl}^s + w_{kh}^j},$$

wherein $$u_{km}^s$$

is the state vectors of the modified particles of the small-weight particle set, $$u_{kl}^s$$

is a state vector of an s-th particle to be modified in a small-weight particle set $$S_1, u_{kh}^j$$

is a state vector of a j-th particle in a large-weight particle set $$S_h, w_{kl}^s$$

is a weight value of a s-th small-weight particle in the small-weight particle set $$S_1, w_{kh}^j$$

is a weight value of a j-th large-weight particle in the large-weight particle set $S_h$, s=1, 2, . . . , $N_l$ and j=1, 2, . . . , $N_h$, $N_l$ and $N_h$ are numbers of the particles in the sets $S_l$ and $S_h$ respectively.

7. The efficient particle filter node positioning method for ocean sensor networks according to claim 5, wherein the modified weights of small-weight particles are:

$$w_k^s = w_{k-1}^s p(z_k \mid u_{km}^s)$$

wherein $$w_{k-1}^s$$

represents the weight value of the s-th small-weight particle in the small-weight particle set $S_l$ at the k−1 moment, $$w_{k-1}^s$$

represents the weight value of the s-th small-weight particle in the small-weight particle set $S_l$ at the k moment, $$u_{km}^s$$

represents the state vectors of the modified particles of the small-weight particle set, $z_k$ represents the observed value at the k moment, and $$p(z_k \mid u_{km}^s)$$

represents the posterior distribution corresponding to the modified particles of the small-weight particle set.

8. The efficient particle filter node positioning method for ocean sensor networks according to claim 1, wherein in the S7, when copying the particle sets, a deterministic selection and a random selection are carried out, and when $$C_k^i > 2, \text{wherein } C_k^i$$

is a total number of times that the i-th particle is selected in a process of the deterministic selection in a first step and the random selection in a second step, $\Delta h^1$ represents a maximum deviation value, the $\Delta h^1$ of an i-th particle to be replicated is less than half of a minimum value of an average difference of state vectors between the i-th particle to be replicated and all other particles to be replicated.

9. The efficient particle filter node positioning method for ocean sensor networks according to claim 8, wherein when copying the particle sets, a deviation value between a state vector of a new particle generated according to the third particle state vector $$u_k^{(i)}$$

and the third particle state vector $$u_k^{(i)}$$

is calculated, and an expression of the deviation value is:

$$\Delta h^g = \gamma^i e^{-\frac{2g-1}{p}}, g = 1, 2, \ldots, \left\lfloor \frac{c_k^i - 1}{2} \right\rfloor,$$

wherein $\gamma^i$ is a parameter to adjust a dispersion degree of the i-th particle needing to be resampled, $$C_k^i$$

is a total number of times the i-th particle being selected in the process of the deterministic selection in the first step and the random selection in the second step, g is an index of a corresponding selection times, and p is a number of times selected.

10. The efficient particle filter node positioning method for ocean sensor networks according to claim 1, wherein when the particle sets degenerate, after the S6 and the S7 are executed, an expression of the expected values of the positions is:

$$E(u_k \mid z_{1:k}) = \int p(u_k \mid z_{1:k}) \cdot U_k dU_k \approx \sum_{i=1}^{N} \tilde{w}_k^{(i)} U_k^i,$$

wherein E $(u_k | z_{1:k})$ is the expected values of the positions, $u_k$ is a state of a target to be located, $z_{1:k}$ represents corresponding observation values from moment 1 to k, $U_k$ is the replicated particle set, N is the number of particles, $$\tilde{w}_k^{(i)}$$

is a modified normalized particle weight, and $p(u_k | z_{1:k})$ is the posterior probability distributions of the unknown nodes.

* * * * *